US012594899B2

(12) United States Patent
Takaro et al.

(10) Patent No.: US 12,594,899 B2
(45) Date of Patent: Apr. 7, 2026

(54) STRUCTURAL MEMBER FOR FRONT BOX WITH INTEGRAL FLUID LINE

(71) Applicant: Daimler Truck North America, LLC, Portland, OR (US)

(72) Inventors: Trevor Takaro, Portland, OR (US); Rajashekar Kalarasaiah, Bangalore (IN); Lokesh Pandey, Bangalore (IN); Umang Patel, Portland, OR (US)

(73) Assignee: DAIMLER TRUCK NORTH AMERICA LLC, Portland, OR (US)

( * ) Notice: Subject to any disclaimer, the term of this patent is extended or adjusted under 35 U.S.C. 154(b) by 412 days.

(21) Appl. No.: 18/086,910

(22) Filed: Dec. 22, 2022

(65) Prior Publication Data

US 2023/0202414 A1      Jun. 29, 2023

Related U.S. Application Data

(60) Provisional application No. 63/293,898, filed on Dec. 27, 2021.

(51) Int. Cl.
B62D 25/08 (2006.01)
B60R 16/08 (2006.01)
B62D 21/17 (2006.01)

(52) U.S. Cl.
CPC .............. B60R 16/08 (2013.01); B62D 25/08 (2013.01); B62D 21/17 (2013.01); B62D 25/082 (2013.01)

(58) Field of Classification Search
CPC ...... B62D 21/17; B62D 25/08; B62D 25/082; B62D 25/085; B62D 49/005; B60R 16/08; B60R 13/0846

USPC ......................................................... 296/208
See application file for complete search history.

(56) References Cited

U.S. PATENT DOCUMENTS

| | | | | |
|---|---|---|---|---|
| 3,455,595 A * | 7/1969 | Eggert, Jr. ......... | B62D 25/2036 | 454/127 |
| 6,270,150 B1 * | 8/2001 | Miller ..................... | B62D 21/17 | 296/184.1 |
| 7,270,346 B2 * | 9/2007 | Rowe ....................... | B60K 1/00 | 280/781 |
| 7,419,186 B2 * | 9/2008 | Murakami ............ | E02F 9/0875 | 296/208 |
| 9,499,221 B2 * | 11/2016 | Deck ...................... | B60H 1/243 | |
| 10,787,060 B1 * | 9/2020 | Mayr ..................... | B62D 21/17 | |
| 2004/0154326 A1 * | 8/2004 | Hosokawa ......... | B60H 1/00571 | 62/298 |
| 2011/0074184 A1 * | 3/2011 | Hashikawa ........ | B60H 1/00564 | 296/208 |
| 2017/0029040 A1 * | 2/2017 | Meaige .................. | B62D 25/04 | |
| 2019/0061904 A1 * | 2/2019 | Roe ..................... | B60R 16/0239 | |

(Continued)

*Primary Examiner* — Gregory A Blankenship
(74) *Attorney, Agent, or Firm* — ArentFox Schiff LLP

(57) ABSTRACT

Aspects herein relate to an elongated structural member for use on a front box structure of a vehicle, and a front box structure incorporating the elongated structural member. In some aspects the elongated structural member comprises an elongated rigid frame surrounding an internal space, with a first fluid channel and a second fluid channel within the internal space. The elongated structural has a length, and, in some aspects, the first fluid channel and the second fluid channel extend the length of the structural member and have an open end at each end. In some aspects, the first fluid channel and the second fluid channel are integrally formed with the rigid frame, such as by an extrusion.

15 Claims, 12 Drawing Sheets

(56) References Cited

U.S. PATENT DOCUMENTS

| | | | |
|---|---|---|---|
| 2019/0283807 A1* | 9/2019 | Bremmer | B62D 21/17 |
| 2020/0216118 A1* | 7/2020 | Marukawa | B62D 25/04 |
| 2020/0232187 A1* | 7/2020 | Mani | F16L 11/00 |
| 2021/0016836 A1* | 1/2021 | Moss | B62D 27/065 |
| 2022/0001929 A1* | 1/2022 | Kubota | B62D 25/20 |
| 2022/0097475 A1* | 3/2022 | Huang | B60H 1/00007 |
| 2023/0097065 A1* | 3/2023 | Nam | B62D 21/17 |
| | | | 296/204 |
| 2023/0202414 A1* | 6/2023 | Takaro | B62D 21/17 |
| | | | 296/193.09 |
| 2023/0249507 A1* | 8/2023 | Testa | B60G 7/02 |
| | | | 280/124.109 |
| 2023/0382461 A1* | 11/2023 | Han | B62D 25/04 |
| 2024/0034258 A1* | 2/2024 | Kim | H01M 50/249 |
| 2024/0400136 A1* | 12/2024 | Jayachand | B62D 29/041 |
| 2025/0136182 A1* | 5/2025 | Kieke | B60L 3/0061 |

* cited by examiner

STRUCTURAL MEMBER FOR FRONT BOX WITH INTEGRAL FLUID LINE

CROSS-REFERENCE TO RELATED APPLICATIONS

This application claims priority to U.S. Provisional Application No. 63/293,898 (filed Dec. 27, 2021), entitled Structural Member for Front Box with Integral Fluid Line, which is incorporated herein by reference in its entirety.

TECHNICAL FIELD

Aspects herein relate to a structural member for a front box assembly for a vehicle, such as an at least partially electric vehicle.

BACKGROUND

Traditional vehicles, such as semi-trucks, have an internal combustion engine that is generally located at the front of the vehicle. An electric vehicle or at least partially electric vehicle typically has one or more electric motors that receive power from a battery assembly. The battery assembly and electric motors are supplemented with other necessary components, such as a radiator, other cooling components such as cooling pumps and surge tanks, heating components and air compressor(s) among other things. These components require space, and may be housed in the space at the front of the vehicle typically occupied by the internal combustion engine of traditional vehicles, which may be referred to as the "front box" area.

There is a need to efficiently house the components within a front box of a vehicle in a way that efficiently utilizes space, allows for easy installation and that is structurally sound.

BRIEF DESCRIPTION OF THE DRAWINGS

Examples of aspects herein are described in detail below with reference to the attached drawings figures, wherein.

DETAILED DESCRIPTION

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies.

At a high level, aspects herein relate to an elongated structural member for use on a front box assembly of a vehicle, such as an at least partially electrically powered vehicle, and a front box assembly incorporating the elongated structural member. In some embodiments, the elongated structural member comprises an elongated rigid frame surrounding an internal space and a first fluid channel within the internal space. In some embodiments, the elongated structural member also includes a second fluid channel within the internal space of the rigid frame. The elongated structural member has a length, and, in some embodiments, the first fluid channel and the second fluid channel extend the length of the frame. The frame may have a first end and a second end, and each of the first fluid channel and the second fluid channel may have an open end at both the first end and the second end of the frame. In some embodiments, the first fluid channel and the second fluid channel are integrally formed with the rigid frame, such as by an extrusion. In other embodiments, the elongated frame comprises an outer wall that has a top portion, a bottom portion, an inner side wall extending from the top portion to the bottom portion and an outer side wall extending from the top portion to the bottom portion. The top portion, bottom portion, inner side wall and outer side wall form the internal space. In some embodiments, the rigid frame further includes a first flange extending upwardly from the top portion that is flush with the inner side wall and a second flange extending downwardly from the bottom portion that is also flush with the inner side wall. In some embodiments the top portion, the bottom portion, the inner side wall and the outer side wall define a rectangular internal space.

In some embodiments, a first port extends through the inner side wall and is fluidly coupled to one of the first fluid channel or the second fluid channel. In other embodiments, a second port extends through the outer side wall and is fluidly coupled to the other of the first fluid channel or the second fluid channel. In some embodiments, the open ends of the first fluid channel and the second fluid channel may have a ribbed construction that is adapted to be coupled to one of a channel cap or a fluid hose.

Figure 1:
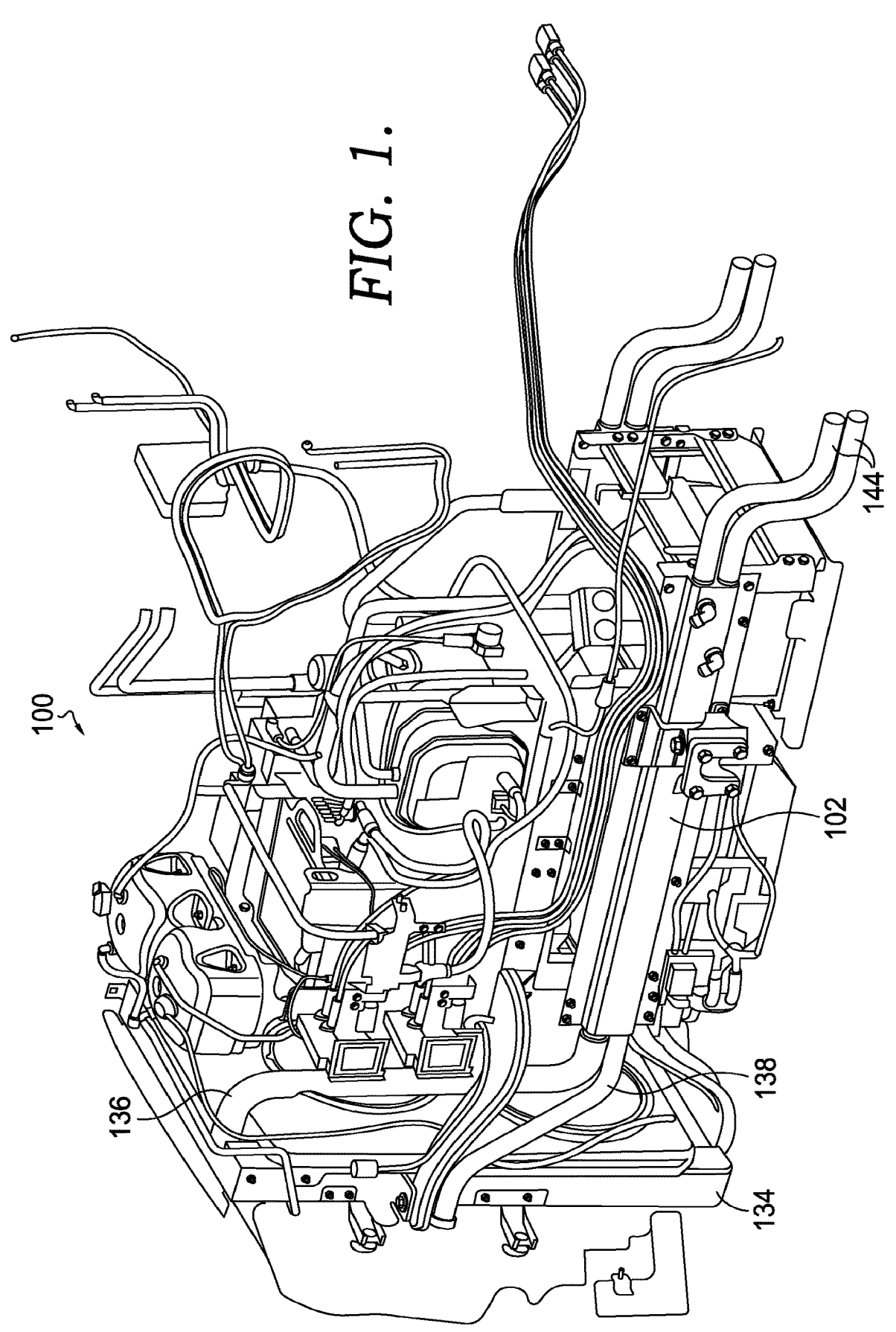
FIG. 1 illustrates an overall perspective view of a front box assembly in accordance with aspects herein.
Figure 2:
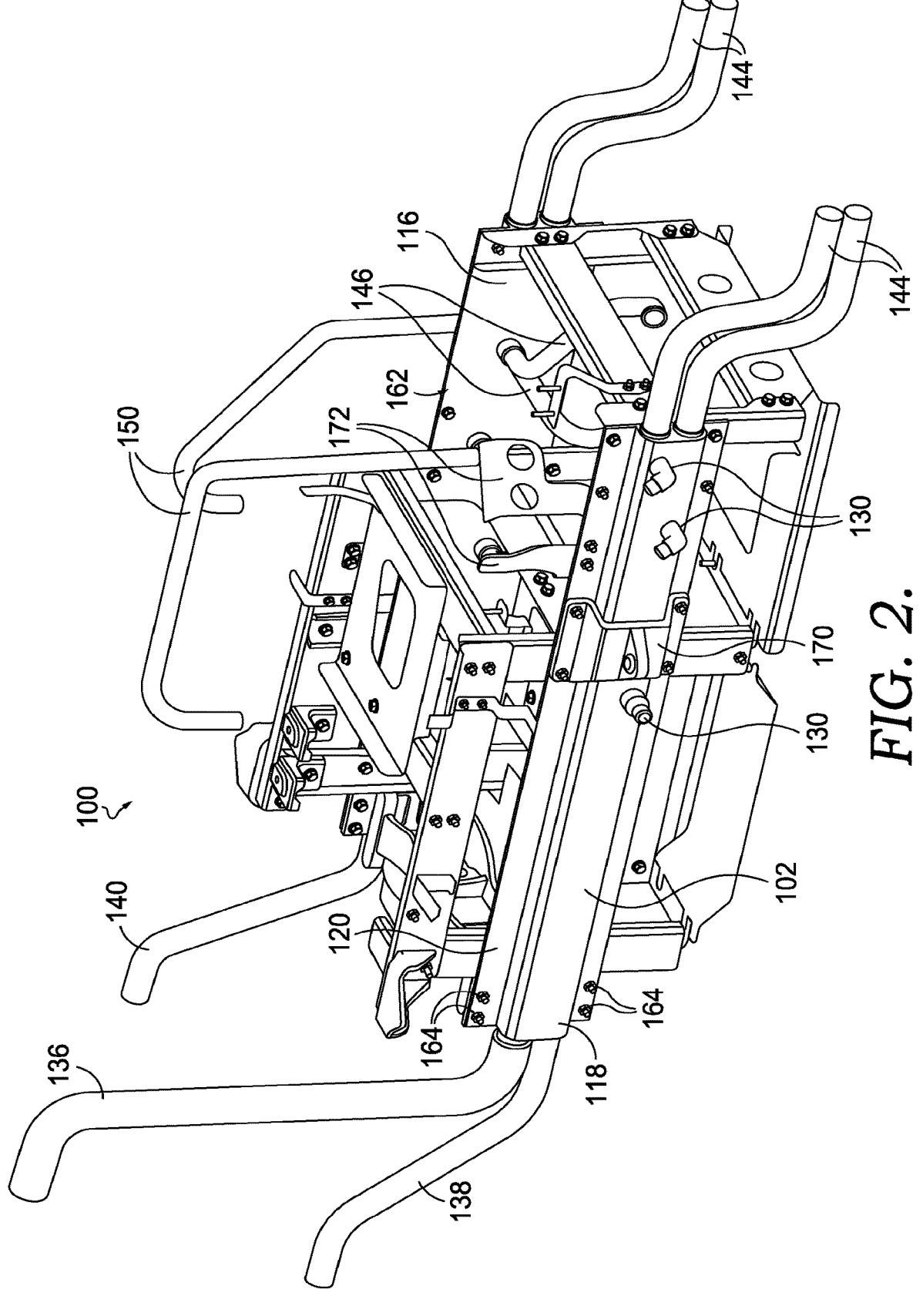
FIG. 2 illustrates a perspective view of selected structural components of the front box assembly of FIG. 1, with other parts removed, in accordance with embodiments herein.
Figure 3:
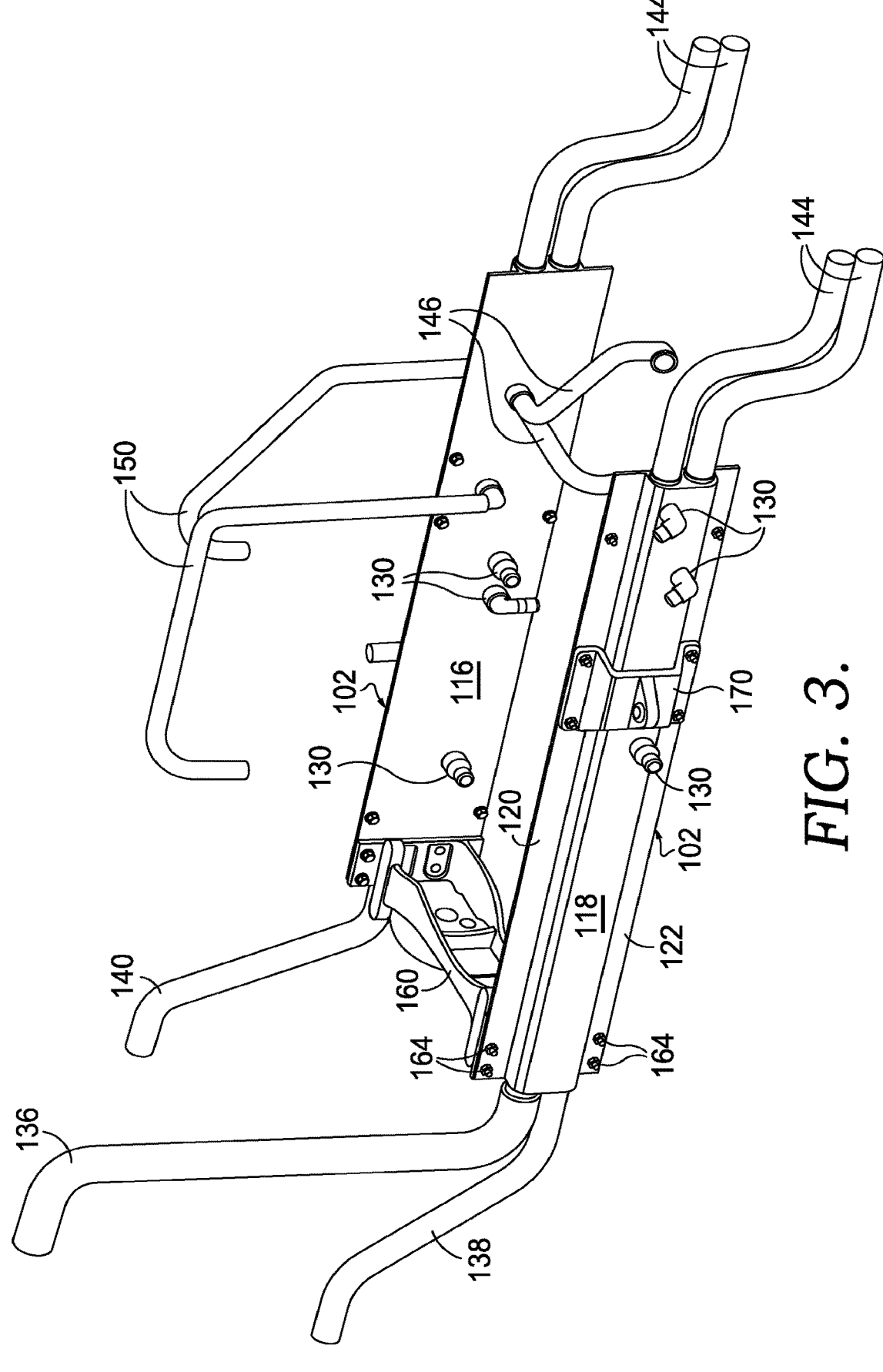
FIG. 3 illustrates a perspective view of the structure of FIG. 2, with additional components removed to reveal details of construction of other components, in accordance with embodiments herein.

FIG. 1 depicts one aspect of a front box assembly 100 that includes one or more elongated structural members 102. FIG. 1 is presented for context to illustrate where, within the front box assembly 100, the elongated structural members 102 might fit, and to illustrate the importance of efficiently utilizing all available space. FIGS. 2 and 3 depict a moresimplified view, with some components of the front box assembly 100 removed for clarity. Turning first to FIG. 3, a pair of elongated structural members 102 are shown, spaced from one another. As described in detail below, other cross-members and c-channels are used to couple the elongated structural members 102 together to form a frame-like structure that may be used to support other components. Each structural member 102 is elongated, extending in a direction along the length of the electric vehicle. As seen in the cross-section of FIG. 11, the structural member 102 includes a rigid outer frame 104 that defines an internal space 106. The internal space 106 is occupied, in some embodiments, with a first fluid channel 108 and a second fluid channel 110 that extend along the length of the structural member 102. The rigid outer frame 104 may, in some embodiments, be rectangular in shape defined by a top portion 112, a bottom portion 114, an inner side wall 116 and an outer side wall 118. The structural member 102 may also include a first flange 120 that extends upwardly from the top portion 112 and a second flange 122 that extends downwardly from the bottom portion 114. In some embodiments, the first flange 120, the inner side wall 116 and the second flange 122 are integrally formed and flush with one another. In some embodiments, the elongated structural member 102, including the outer frame 104, the first flange 120, the second flange 122, the first fluid channel 108 and the second fluid channel 110 are all integrally formed as an extrusion. While the frame 104 is shown as rectangular, other shapes could also be utilized.

Figure 12:
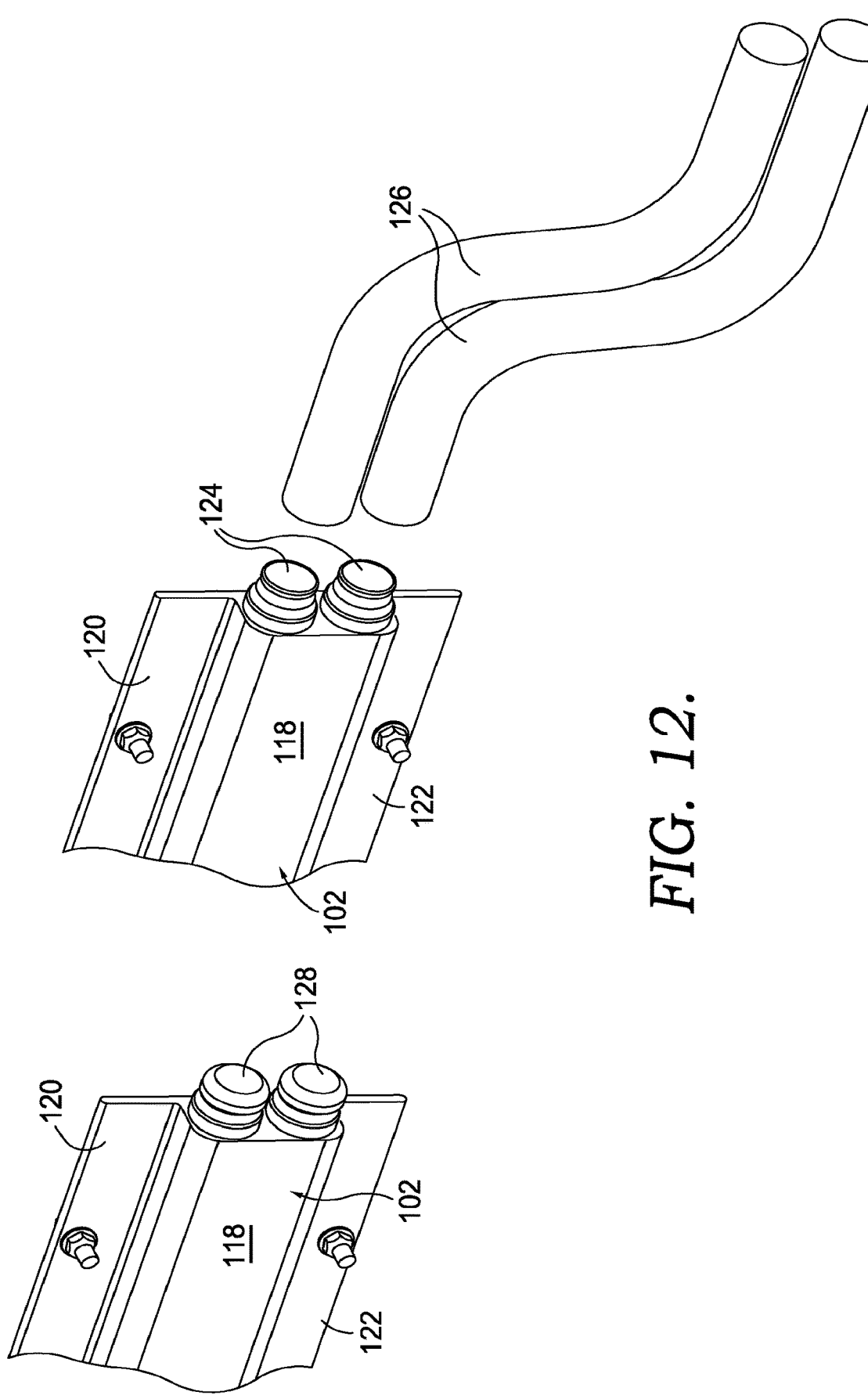
FIG. 12 is a view of one aspect of a hose connection to a structural member of the front box structure, in accordance with embodiments herein.

As shown in FIG. 12, each of the first fluid channel 108 and the second fluid channel 110 may have terminal ends at the end of the structural member 102 that are fitted with ribbed connectors 124 that allow a corresponding hose 126 to be coupled to the respective fluid channel (108/110). The hoses 126 represented in FIG. 12 could be any of a number of inlet or outlet hoses described further below (such as hoses 136, 138, 140, 142 and 144). In other embodiments, if the fluid channel 108 and/or the fluid channel 110 are not being used to carry fluid in the system, a channel cap 128 may be fitted to the end of the fluid channel to effectively close the respective fluid channel (108/110).

Figure 11:
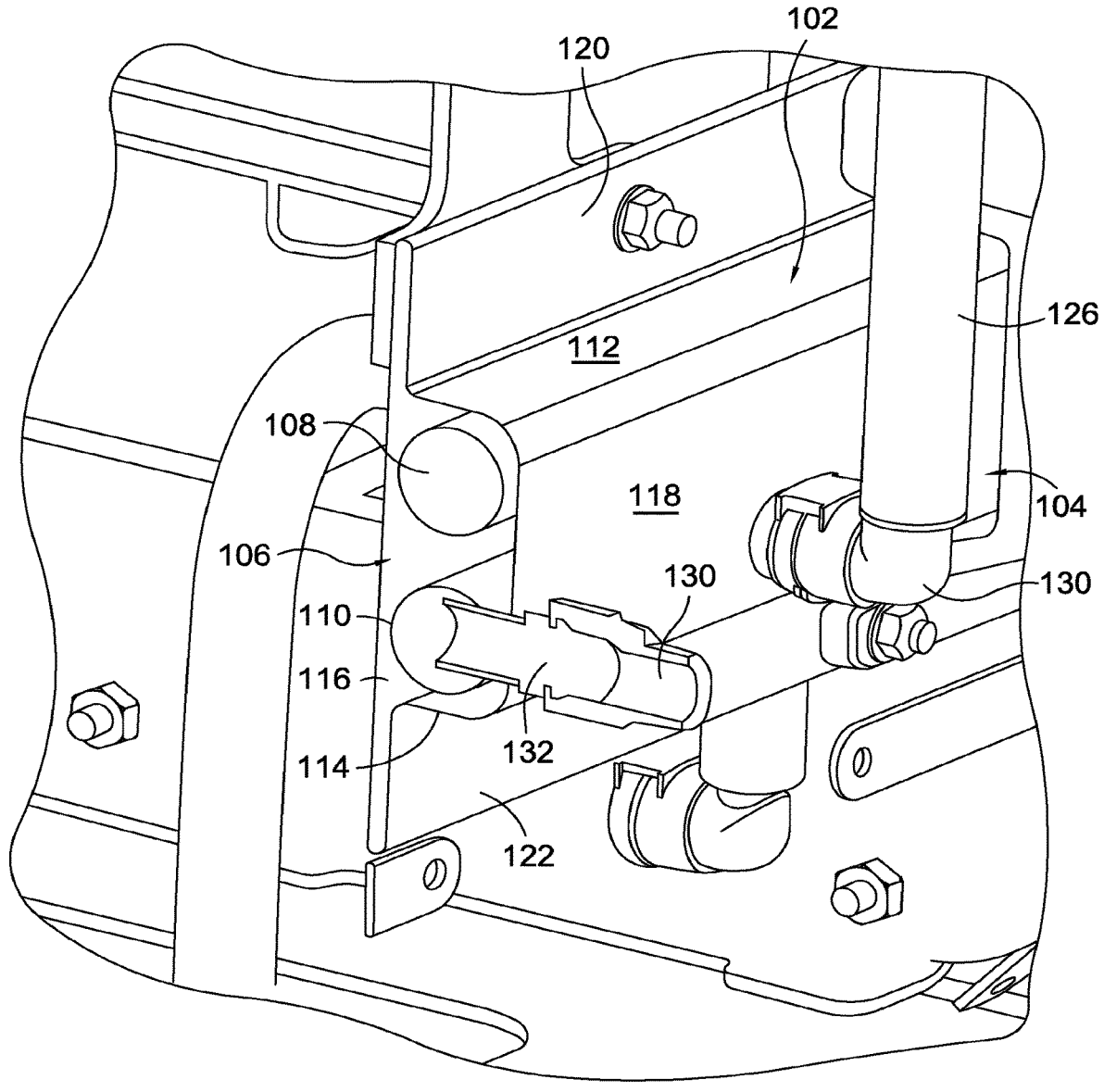
FIG. 11 is an enlarged partial cross section showing particular details of construction, in accordance with embodiments herein.

Each of the first fluid channel 108 and the second fluid channel 110 may be accessed by tapping through the inner side wall 116 and/or the outer side wall 118. FIG. 3 depicts a number of different connectors 130 that may be used to port into the first fluid channel 108 and/or the second fluid channel 110. The connectors 130 may be any of a number of fluid line connectors, such as straight or 90 degree VDA connectors. The connectors 130 may then be coupled to fluid supply or return lines extending to components of the front box assembly 100 as is described further below. As shown in FIG. 11, in some embodiments, a VDA spigot 132 may be used to couple the respective fluid line (108/110) to the connector 130.

Figure 7:
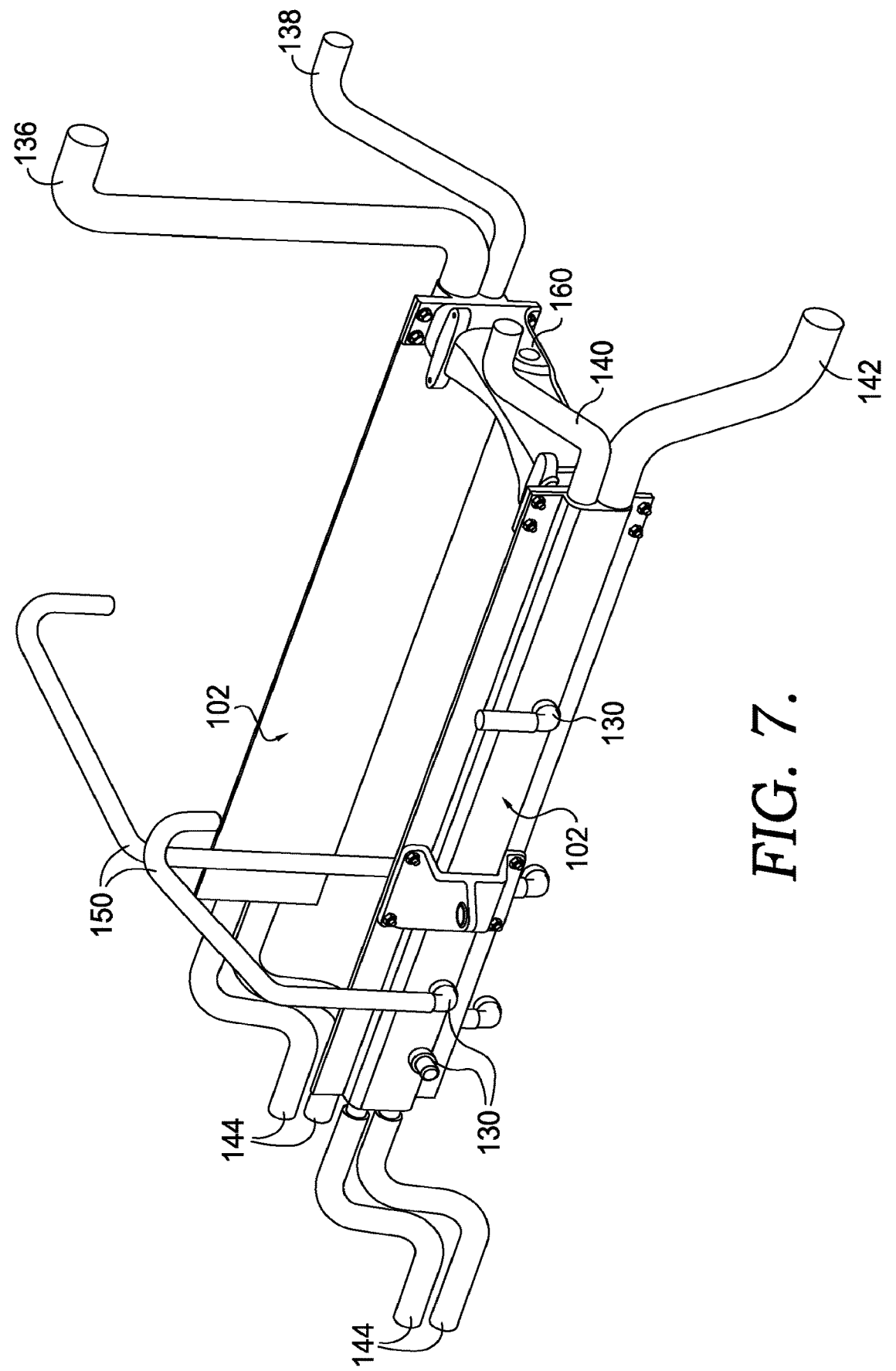
FIG. 7 is a view similar to FIG. 6 but from the other side, in accordance with embodiments herein
Figure 8:
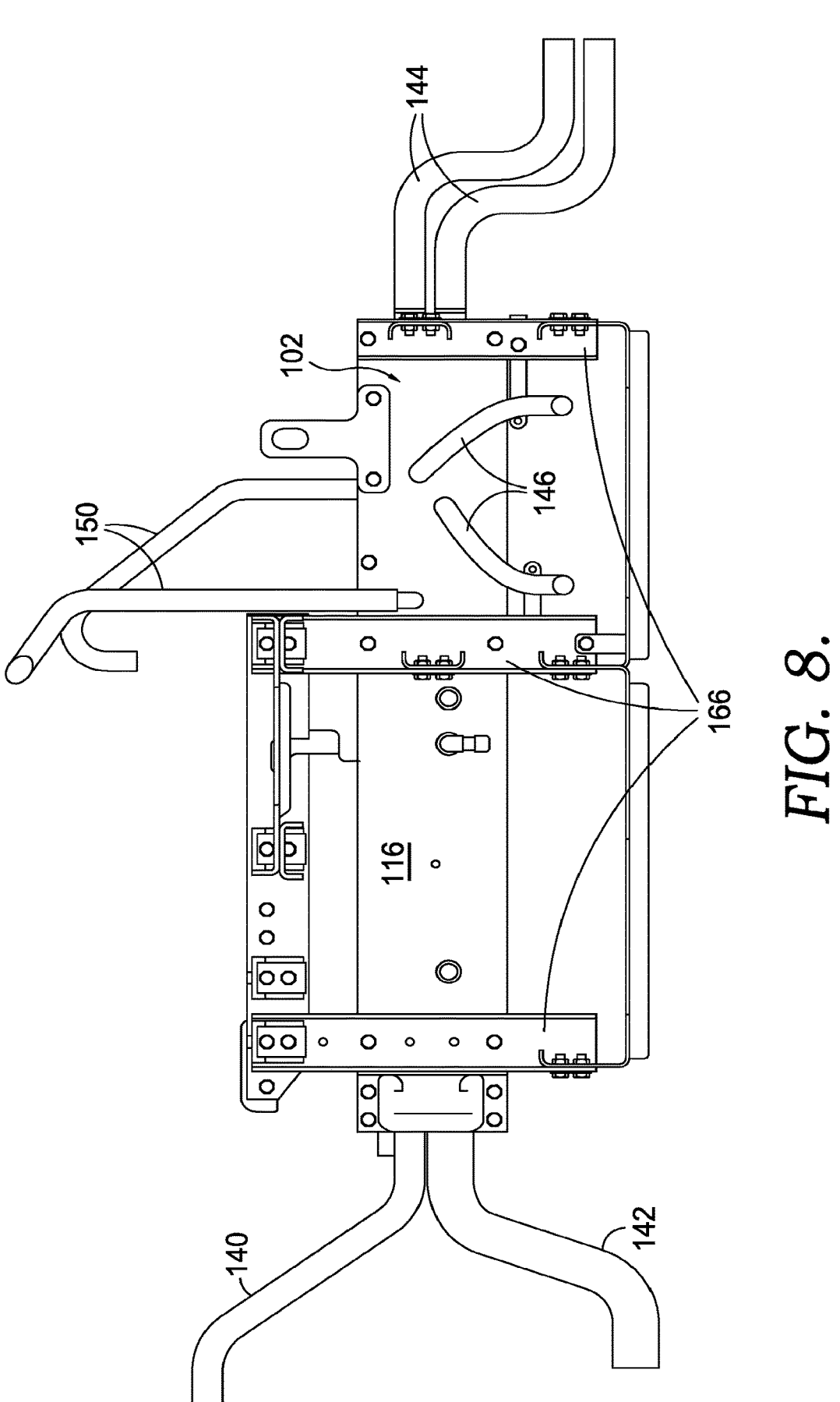
FIG. 8 is a cross-sectional view of FIG. 6, in accordance with embodiments herein.

As best seen in FIG. 1, the front box assembly 100 may include a radiator 134. The radiator 134, in some embodiments, is in fluid communication with a structural member 102 on each side of the front box assembly 100. More specifically, on one side of the front box assembly 100, a high temperature radiator line 136 extends from the hot side of the radiator to the first fluid channel 108 (in some embodiments coupled by a ribbed connector 124). A low temperature radiator line 138 also extends from the hot side of the radiator to the second fluid channel 110 (also connected, in some embodiments, through a ribbed connector 124). As best seen in FIGS. 7 and 8, on the other side of the front box assembly 100, in some embodiments, a low temperature radiator line 140 extends from the cold side of the radiator 134 to a structural member 102, and specifically to the first fluid channel 108 (coupled, in some embodiments, through a ribbed connector 124). Similarly, a high temperature radiator line 142 may be coupled to cold side of the radiator 134 through the second fluid channel 110 through a ribbed connector 124.

On the end of the structural members 102 farther from the radiator 134, fluid lines 144 may be coupled to the first fluid channel 108 and the second fluid channel 110, and may extend rearwardly to make fluid available to other components of the electric vehicle.

Figure 4:
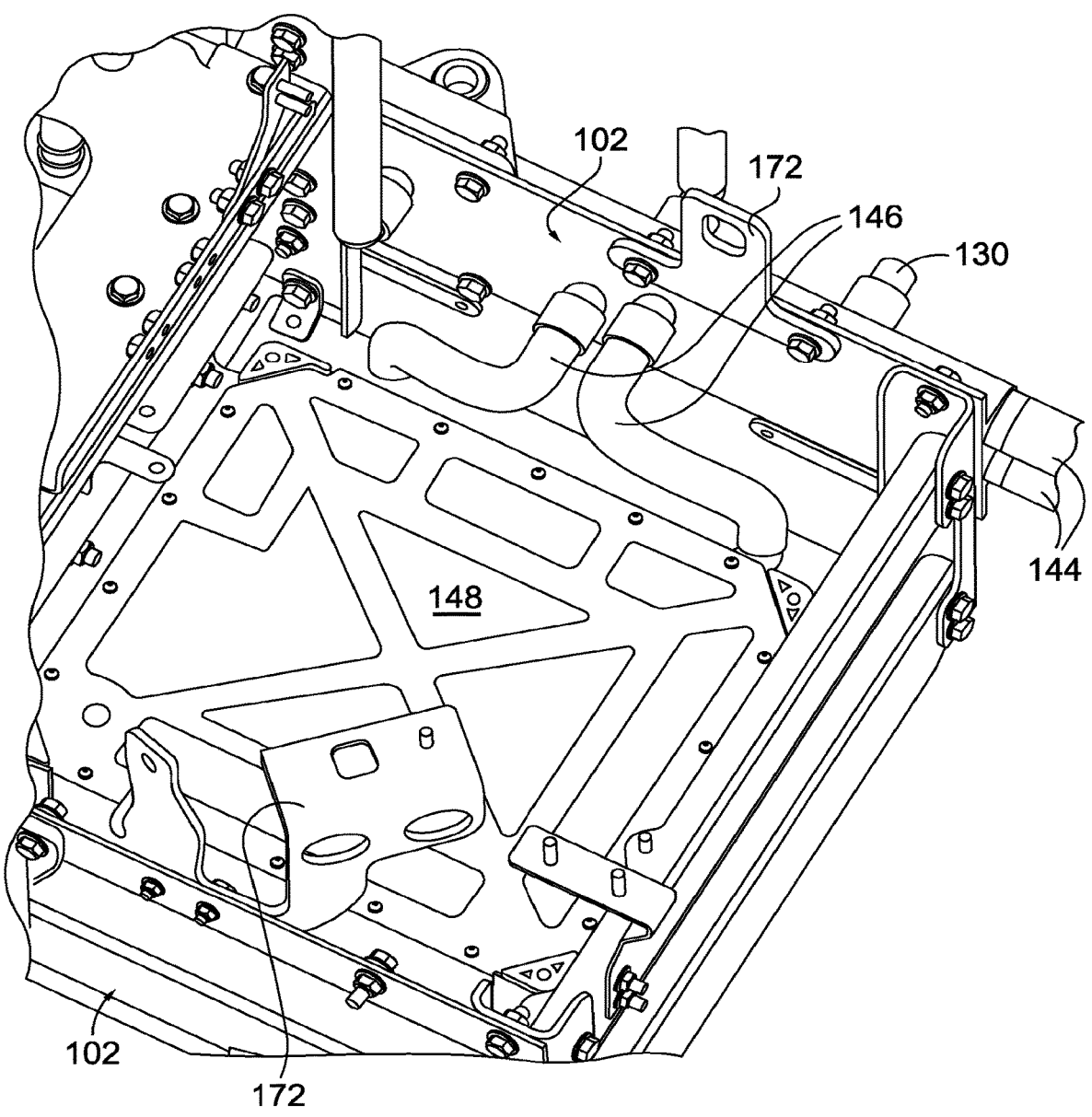
FIG. 4 illustrates a top partial perspective view of the front box assembly, showing plumbing to a DC-DC converter, in accordance with embodiments herein.
Figure 5:
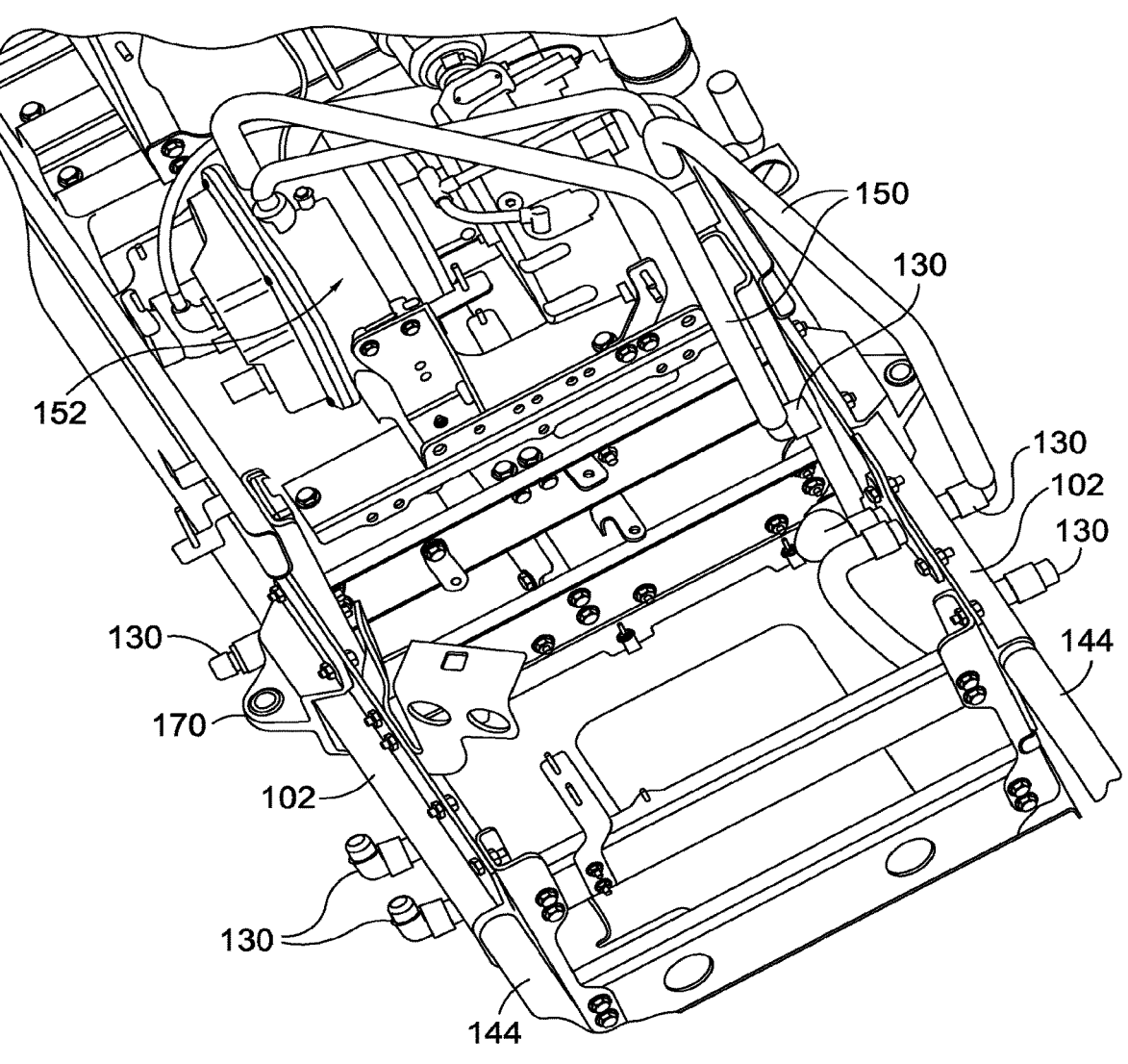
FIG. 5 illustrates a top partial perspective view of the front box assembly, showing plumbing to an air compressor, in accordance with embodiments herein.
Figure 6:
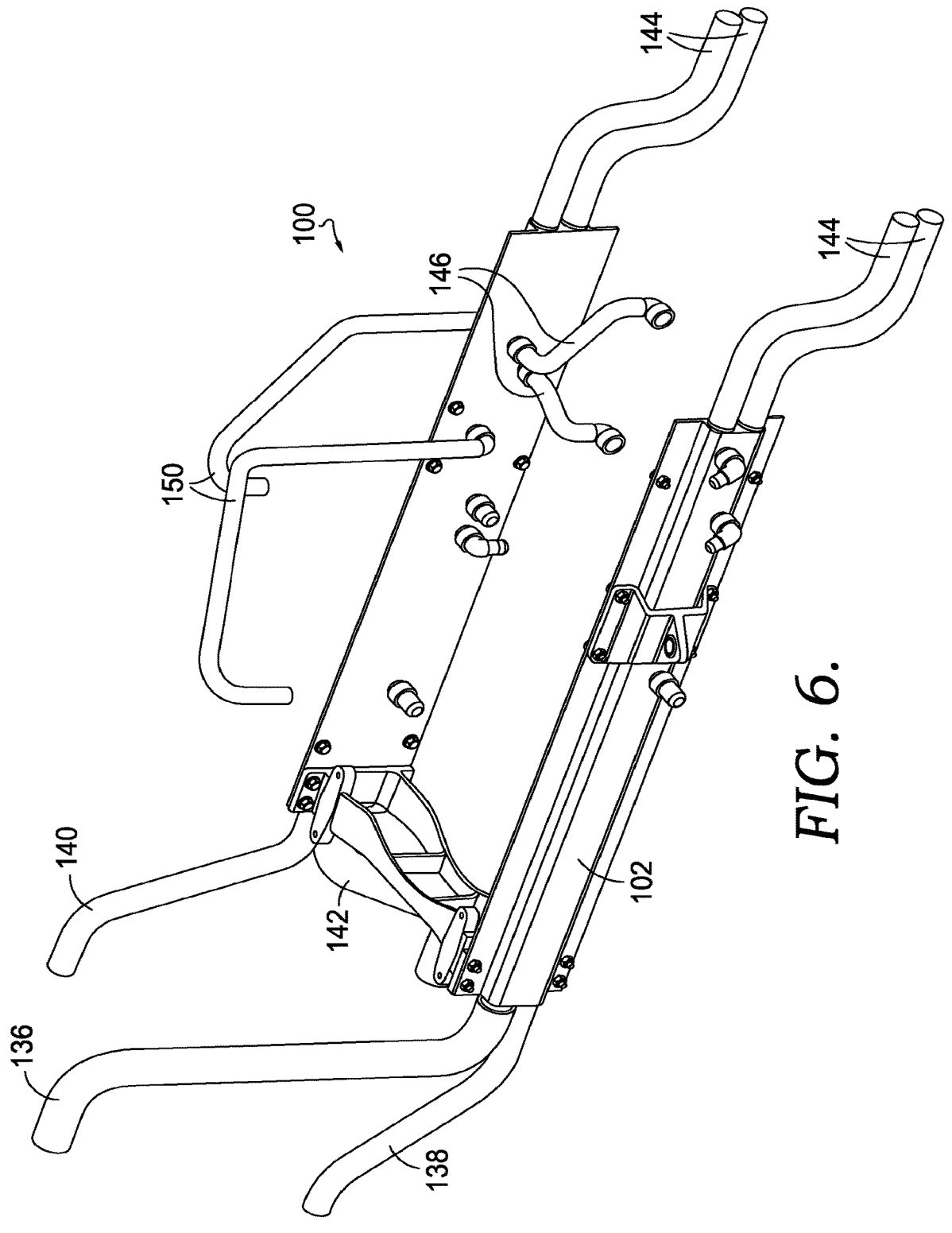
FIG. 6 illustrates a perspective view similar to FIG. 2 from one side, in accordance with embodiments herein.

As best seen in FIGS. 3 and 4, the first fluid channel 108 and the second fluid channel 110 are accessible through the inner side wall 116 (such as by using a VDA spigot (similar to that shown as VDA spigot 132 in FIG. 11)). The structural member 102 having integrated first fluid channel 108 and integrated second fluid channel 110 allows access to the fluid in close proximity to the component using the fluid. As shown in FIGS. 3 and 4, fluid lines 146 may tap into the first fluid channel 108 and the second fluid channel 110 (while not visible in FIGS. 3 and 4, the first fluid channel 108 and the second fluid channel 110 are accessed through the inner side wall 116, in one aspect) on the cold side and may extend and be coupled to a DC-DC converter 148. As shown in FIG. 4, the fluid lines 146 are in relatively close proximity to the DC-DC converter 148. Similarly, as best seen in FIGS. 3 and 5, fluid lines 150 may tap into the first fluid channel 108 and the second fluid channel 110 on the cold side and may extend to an air compressor 152. As shown in FIGS. 3 and 5, one fluid line 150 may tap into the inner side wall 116, and the other fluid line 150 may tap into the outer side wall 118. The structural member 102, having integral first fluid channel 108 and integral second fluid channel 110, allows flexibility regarding the positioning of the various fluid lines, in that the first fluid channel 108 and the second fluid channel 110 can be tapped into (via a spigot such as VDA spigot 132 and any of a number of connectors (such as straight or ninety degree VDA connectors 130)). Other fluid connections could be made at any point along the length of the structural member 102, and it should be understood that the connections described above are in no way meant to be limiting.

In addition to providing convenient access to needed fluids, the structural members 102 at least partially eliminate the need for rigid, welded fluid lines extending in, through and around the front box assembly. This offers a space-saving benefit, in that the front box assembly 100 may be widened to add space for other components, or to provide space to allow easier servicing of the components within the front box assembly 100.

Figure 9:
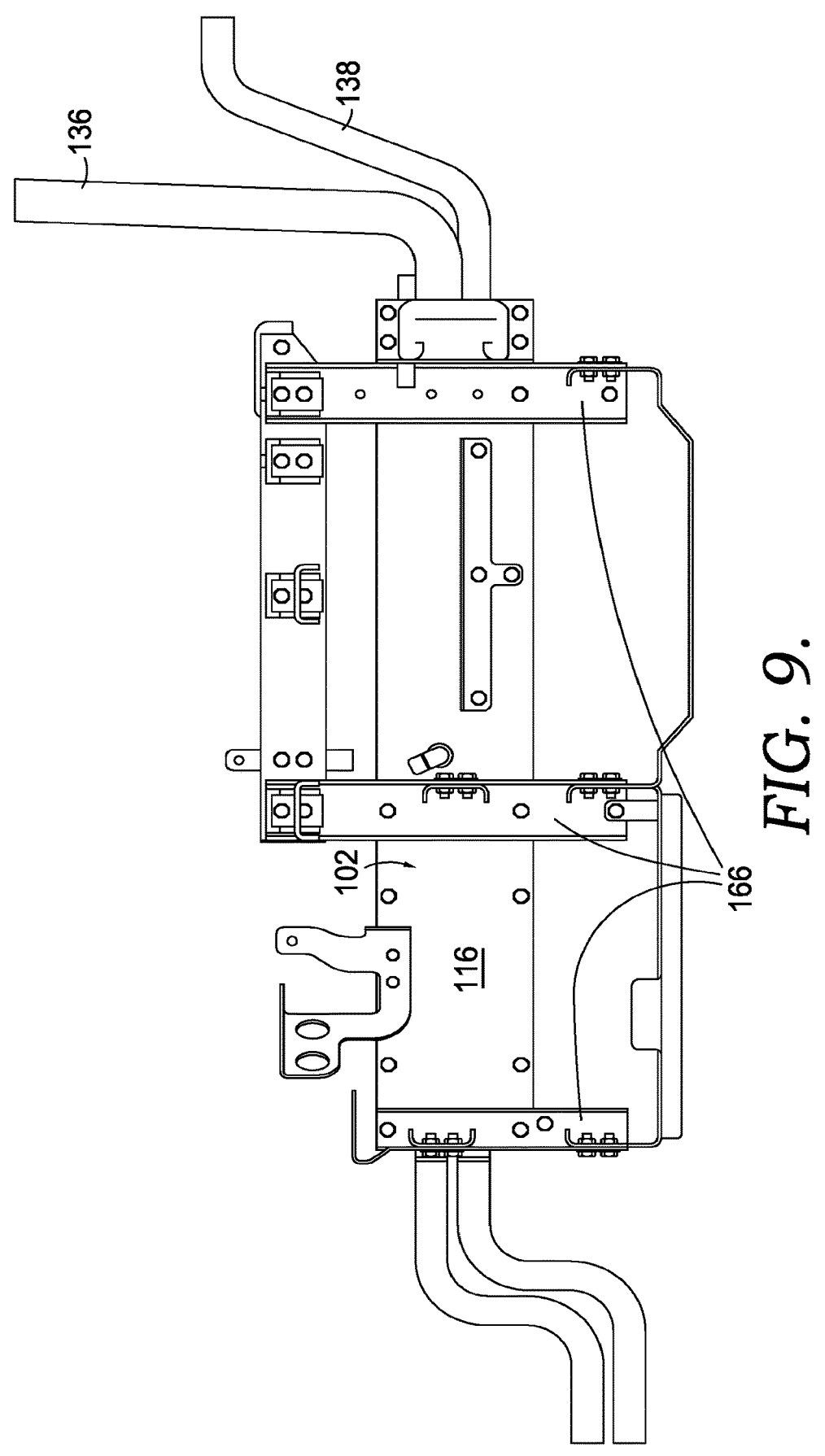
FIG. 9 is a cross-sectional view of FIG. 6 from an opposite direction of FIG. 8, in accordance with embodiments herein.
Figure 10:
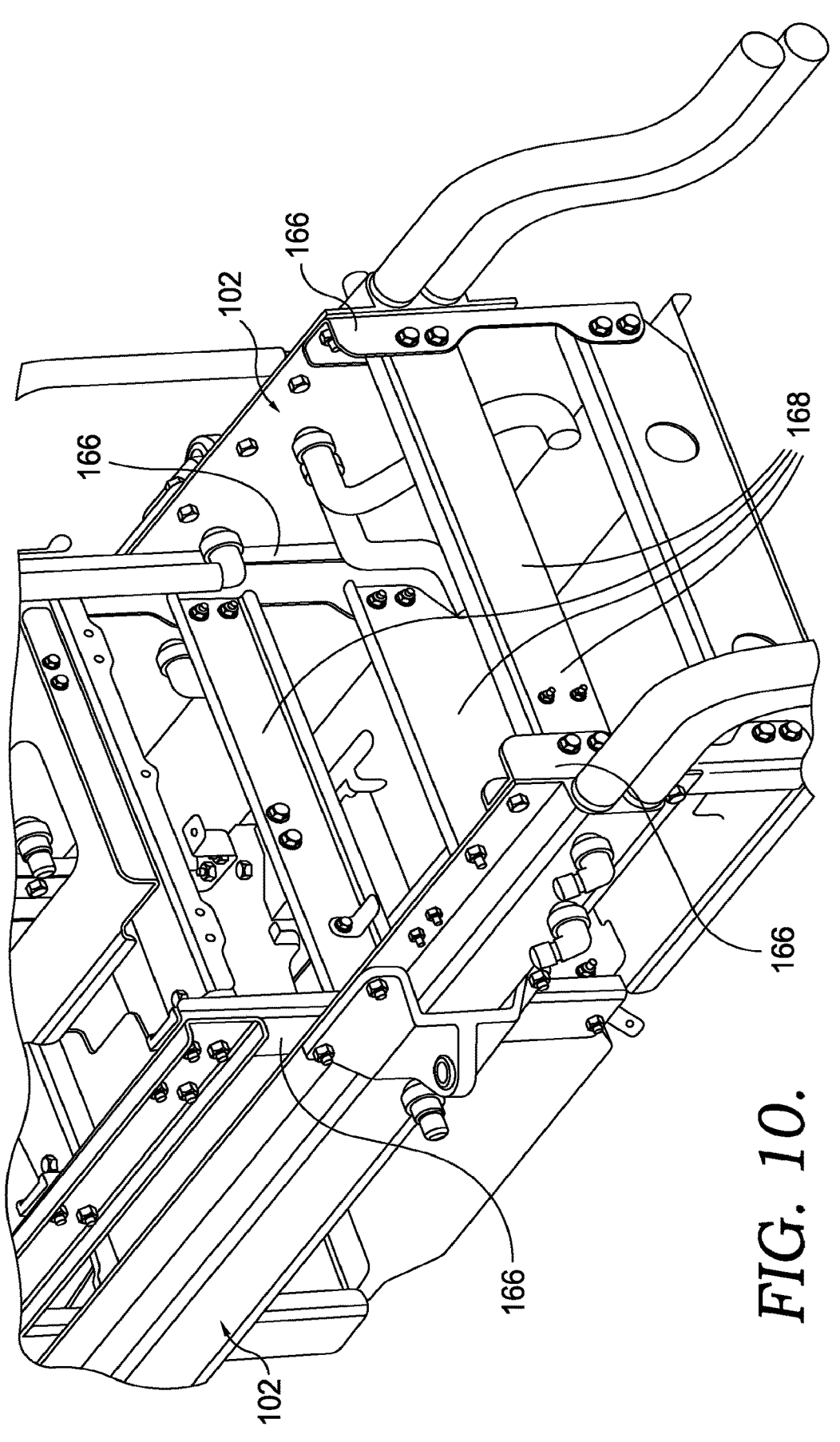
FIG. 10 is an enlarged, partial perspective view showing cross-support members as part of the front box assembly, in accordance with embodiments herein.

The structural members 102 also provide support and structural integrity to the front box assembly 100. As best seen in FIG. 3, the structural members 102 may be coupled to one another at the front end through a rigid front cross member 160. The front cross member 160 may be coupled to a front drop casting which can be used, in part, to couple the front box assembly 100 to a vehicle frame. In some embodiments, the front cross member 160 is coupled to the first flange 120 and the second flange 122 of the structural member 102 with bolts 164 (although any of a number of attachment mechanisms could be used). Additionally, as best seen in FIGS. 8 and 9, a number of vertical supports 166 may be fixedly coupled to the first flange 120 and/or second flange 122 on each structural member 102. In some embodiments, the vertical supports 166 are c-channels and may be constructed of a sturdy, rigid material, such as steel or aluminum. Horizontal cross supports 168 may be coupled to, and extend between, opposing vertical supports 166, as seen in FIG. 10, for example. The horizontal cross supports 168 may be coupled to the vertical supports 166, such as by bolting, although other attachment mechanisms could be used. The vertical supports 166 and the horizontal cross supports 168, along with the structural members 102, form a frame that may be used to support other components, such as brackets, trays, or lifting eyes (such as those labeled as 172 in FIGS. 2 and 4, for example), as well as other functional components of the front box assembly. The structural member 102 may also be coupled to a rear mounting bracket 170. In some embodiments, the rear mounting bracket 170 is bolted to the first flange 120 and the second flange 122 on each structural member 102. The rear mounting brackets 170 may be used to couple the front box assembly 100 to a frame of the vehicle.

The structural members 102 reduce the amount of rigid tubing that needs to be fixed in place with brackets, or welding, or both. The structural members 102 also allow fluid lines to be tapped closer to the components using the fluid, resulting in a front box assembly 100 that more-efficiently utilizes available space as well as utilizing fewer parts on the front box assembly 100. Additionally, the extrusion box-like structure of the structural members 102 results in a stronger framework as compared to c-channel structures utilized in the past.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are illustrative in nature and are not limiting.

Clause 1. An elongated structural member for use on a front box structure of a vehicle, the elongated structural member comprising: an elongated rigid frame surrounding an internal space; and at least a first fluid channel within the internal space.

Clause 2. The elongated structural member of clause 1, further comprising at least a second fluid channel within the internal space of the rigid frame.

Clause 3. The elongated structural member of any of clauses 1-2, wherein the elongated frame has a length, and wherein the first fluid channel and the second fluid channel extend the length of the elongated frame.

Clause 4. The elongated structural member of any of clauses 1-3, wherein the elongated frame has a first end and a second end, and wherein each of the first fluid channel and the second fluid channel have an open end at both the first end and the second end of the elongated frame.

Clause 5. The elongated structural member of any of clauses 1-4, wherein the first fluid channel and the second fluid channel are integrally formed with the elongated frame.

Clause 6. The elongated structural member of any of clauses 1-5, wherein the elongated frame comprises an outer wall, the outer wall including a top portion, a bottom portion, an inner side wall extending from the top portion to the bottom portion and an outer side wall extending from the top portion to the bottom portion; the top portion, bottom portion, inner side wall and outer side wall forming the internal space, and wherein the rigid frame further comprises a first flange extending upwardly from the top portion and flush with the inner side wall and a second flange extending downwardly from the bottom portion and flush with the inner side wall.

Clause 7. The elongated structural member of any of clauses 1-6, wherein the top portion, the bottom portion, the inner side wall and the outer side wall define a rectangular internal space.

Clause 8. The elongated structural member of any of clauses 1-7, further comprising at least a first port extending through the inner side wall and fluidly coupled to one of the first fluid channel or the second fluid channel.

Clause 9. The elongated structural member of any of clauses 1-8, further comprising at least a second port extending through the outer side wall and fluidly coupled to the other of the first fluid channel or the second fluid channel.

Clause 10. The elongated structural member of any of clauses 1-9, wherein the open ends of the first fluid channel and the second fluid channel have a ribbed construction adapted to be coupled to one of a channel cap or a fluid hose.

Clause 11. An elongated structural member for use on a front box structure of an at least partially electrically powered vehicle, the elongated structural member comprising: an elongated rigid frame surrounding an internal space; a first fluid channel integrated within the internal space; and a second fluid channel integrated within the internal space.

Clause 12. The elongated structural member of clause 11, wherein the elongated frame has a length, and wherein the first fluid channel and the second fluid channel extend the length of the elongated frame.

Clause 13. The elongated structural member of any of clauses 11-12, wherein the elongated frame comprises an outer wall, the outer wall including a top portion, a bottom portion, an inner side wall extending from the top portion to the bottom portion and an outer side wall extending from the top portion to the bottom portion, the top portion, bottom portion, inner side wall and outer side wall forming the internal space, and wherein the rigid frame further comprises a first flange extending upwardly from the top portion and flush with the inner side wall and a second flange extending downwardly from the bottom portion and flush with the inner side wall, the elongated structural member further comprising at least one bracket coupled to one of the first flange and the second flange, the at least one bracket adapted to support at least one component of the at least partially electric vehicle.

Clause 14. A front box structure for a vehicle, comprising: a first elongated structural member having a rigid frame and at least one integral fluid line; a second elongated structural member having a rigid frame and at least one integral fluid line; and a plurality of cross supports extending between and coupled to the first elongated structural member and the second elongated structural member.

Clause 15. The front box structure of clause 14, further comprising: a plurality of vertical supports coupled to each of the first elongated structural member and the second elongated structural member; and at least one vehicle component supported by at least one of the plurality of vertical supports and extending above or below the vertical supports.

Clause 16. The front box structure of any of clauses 14-15, wherein the rigid frame of the first elongated structural member and the rigid frame of the second elongated structural member each includes a plurality of ports, each port accessing the integral fluid line of the corresponding elongated structural member.

Clause 17. The front box structure of any of clauses 14-16, wherein the first elongated structural member and the second elongated structural member each include two integral fluid lines.

Clause 18. The front box structure of any of clauses 14-17, wherein the first elongated structural member and the second elongated structural member each have a length, and wherein the integral fluid lines extend the length of the first and second elongated structural members.

Clause 19. The front box structure of any of clauses 14-18, wherein each of the fluid lines of the first and second elongated structural members have an open end at each end thereof.

Clause 20. The front box structure of clause 19, wherein at least one of the ports extends inwardly and orthogonally to the length of the first and second elongated structural members and at least one of the ports extends outwardly and orthogonally to the length of the first and second elongated structural members.

Aspects of the present disclosure have been described with the intent to be illustrative rather than restrictive. Alternative aspects will become apparent to those skilled in the art that do not depart from its scope. A skilled artisan may develop alternative means of implementing the afore-mentioned improvements without departing from the scope of the present disclosure.

It will be understood that certain features and subcombi-nations are of utility and may be employed without reference to other features and subcombinations and are contemplated within the scope of the claims. Not all steps listed in the various figures need be carried out in the specific order described.

What is claimed is:

1. An elongated structural member for use on a front box structure of a vehicle, the elongated structural member comprising:
an elongated rigid frame surrounding an internal space;
at least a first fluid channel and a second fluid channel within the internal space;
wherein the elongated rigid frame comprises an outer wall, the outer wall including a top portion, a bottom portion, an inner side wall extending from the top portion to the bottom portion and an outer side wall extending from the top portion to the bottom portion, the top portion, bottom portion, inner side wall and outer side wall forming the internal space, and wherein the elongated rigid frame further comprises a first flange extending upwardly from the top portion and flush with the inner side wall and a second flange extending downwardly from the bottom portion and flush with the inner side wall; and
further comprising a first port and a second port, wherein the second port extends through the outer side wall and is fluidly coupled to the first fluid channel or the second fluid channel.

2. The elongated structural member of claim 1, wherein the elongated rigid frame has a length, and wherein the first fluid channel and the second fluid channel extend the length of the elongated rigid frame.

3. The elongated structural member of claim 2, wherein the elongated rigid frame has a first end and a second end, and wherein each of the first fluid channel and the second fluid channel have an open end at both the first end and the second end of the elongated rigid frame.

4. The elongated structural member of claim 3, wherein the first fluid channel and the second fluid channel are integrally formed with the elongated rigid frame.

5. The elongated structural member of claim 1, wherein the top portion, the bottom portion, the inner side wall and the outer side wall define a rectangular internal space.

6. The elongated structural member of claim 1, further comprising at least a first port extending through the inner side wall and fluidly coupled to one of the first fluid channel or the second fluid channel.

7. The elongated structural member of claim 3, wherein the open ends of the first fluid channel and the second fluid channel have a ribbed construction adapted to be coupled to one of a channel cap or a fluid hose.

8. An elongated structural member for use on a front box structure of an at least partially electrically powered vehicle, the elongated structural member comprising:
an elongated rigid frame surrounding an internal space;
a first fluid channel integrated within the internal space; and
a second fluid channel integrated within the internal space;
wherein the elongated rigid frame comprises an outer wall, the outer wall including a top portion, a bottom portion, an inner side wall extending from the top portion to the bottom portion and an outer side wall extending from the top portion to the bottom portion, the top portion, bottom portion, inner side wall and outer side wall forming the internal space, and wherein the elongated rigid frame further comprises a first flange extending upwardly from the top portion and flush with the inner side wall and a second flange extending downwardly from the bottom portion and flush with the inner side wall, the elongated structural member further comprising at least one bracket coupled to one of the first flange and the second flange, the at least one bracket adapted to support at least one com-ponent of the at least partially electric vehicle.

9. The elongated structural member of claim 8, wherein the elongated rigid frame has a length, and wherein the first fluid channel and the second fluid channel extend the length of the elongated rigid frame.

10. A front box structure for a vehicle, comprising:
a first elongated structural member having a rigid frame and at least one integral fluid line;
a second elongated structural member having a rigid frame and at least one integral fluid line;
a plurality of cross supports extending between and coupled to the first elongated structural member and the second elongated structural member;
a plurality of vertical supports coupled to each of the first elongated structural member and the second elongated structural member; and
at least one vehicle component supported by at least one of the plurality of vertical supports and extending above or below the vertical supports.

11. The front box structure of claim 10, wherein the rigid frame of the first elongated structural member and the rigid frame of the second elongated structural member each includes a plurality of ports, each port accessing the integral fluid line of the corresponding elongated structural member.

12. The front box structure of claim 11, wherein the first elongated structural member and the second elongated struc-tural member each include two integral fluid lines.

13. The front box structure of claim 12, wherein the first elongated structural member and the second elongated struc-tural member each have a length, and wherein the integral fluid lines extend the length of the first and second elongated structural members.

14. The front box structure of claim 13, wherein each of the fluid lines of the first and second elongated structural members have an open end at each end thereof.

15. The front box structure of claim 14, wherein at least one of the ports extends inwardly and orthogonally to the length of the first and second elongated structural members and at least one of the ports extends outwardly and orthogonally to the length of the first and second elongated structural members.

\*    \*    \*    \*    \*